(12) United States Patent
Ikeda

(10) Patent No.: US 10,080,349 B2
(45) Date of Patent: Sep. 25, 2018

(54) MOUNTING BEHAVIOR DETECTION SYSTEM AND DETECTION METHOD

(71) Applicant: KYOCERA Corporation, Kyoto-shi, Kyoto (JP)

(72) Inventor: Tomoyoshi Ikeda, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/715,479

(22) Filed: Sep. 26, 2017

(65) Prior Publication Data
US 2018/0035648 A1 Feb. 8, 2018

Related U.S. Application Data

(63) Continuation of application No. PCT/JP2016/001351, filed on Mar. 10, 2016.

(30) Foreign Application Priority Data

Mar. 31, 2015 (JP) ................... 2015-072129
Mar. 31, 2015 (JP) ................... 2015-072130
Mar. 31, 2015 (JP) ................... 2015-072239
Mar. 31, 2015 (JP) ................... 2015-072240

(51) Int. Cl.
*G08B 23/00* (2006.01)
*A01K 29/00* (2006.01)
*H04B 5/00* (2006.01)
*A01K 11/00* (2006.01)

(52) U.S. Cl.
CPC .......... *A01K 29/005* (2013.01); *A01K 11/006* (2013.01); *H04B 5/0062* (2013.01)

(58) Field of Classification Search
CPC ................ A61D 17/002; A01K 11/006
USPC .................................... 340/573.3
See application file for complete search history.

(56) References Cited

U.S. PATENT DOCUMENTS

| 4,503,808 A | * | 3/1985 | McAlister | A61D 17/002 600/551 |
| 4,846,106 A | | 7/1989 | Leonardo | |
| 4,895,165 A | * | 1/1990 | Blair | A61B 10/0012 600/551 |
| 5,542,431 A | * | 8/1996 | Starzl | A61B 10/0012 119/174 |

(Continued)

FOREIGN PATENT DOCUMENTS

| JP | S63-192437 A | 8/1988 |
| JP | H06-141385 A | 5/1994 |

(Continued)

OTHER PUBLICATIONS

International Search Report (Form PCT/ISA/210) issued for PCT/JP2016/001351, dated Apr. 12, 2016, 4 pages.
Written Opinion (Form PCT/ISA/237) issued for PCT/JP2016/001351, dated Apr. 12, 2016 with concise explanation, 5 pages.

*Primary Examiner* — Fabricio R Murillo Garcia

(57) ABSTRACT

Mounting behavior or the like by domestic animals or the like is easily detected. Included are a mounting-side apparatus attached to the neck of a first domestic animal and configured to emit a transmission signal, and a mounted-side apparatus attached at any position from the back to the tail of a second domestic animal. A communication interface of the mounted-side apparatus emits a response signal to a communication interface of the mounting-side apparatus.

19 Claims, 10 Drawing Sheets

(56) References Cited

U.S. PATENT DOCUMENTS

| | | | |
|---|---|---|---|
| 5,857,434 | A | 1/1999 | Andersson |
| 6,049,280 | A | 4/2000 | Andersson |
| 6,342,041 | B1 | 1/2002 | Saint-Ramon et al. |
| 8,662,021 | B2 | 3/2014 | Gustaffsson |
| 2008/0066693 | A1* | 3/2008 | Bocquier ............... A01K 21/00 119/859 |
| 2009/0056637 | A1 | 3/2009 | Gustaffsson |

FOREIGN PATENT DOCUMENTS

| | | | |
|---|---|---|---|
| JP | H09-507389 | A | 7/1997 |
| JP | H10-501618 | A | 2/1998 |
| JP | H11-032609 | A | 2/1999 |
| JP | 2000-157084 | A | 6/2000 |
| JP | 2003-189751 | A | 7/2003 |
| JP | 2003-325077 | A | 11/2003 |
| JP | 2004-057069 | A | 2/2004 |
| JP | 2004-337093 | A | 12/2004 |
| JP | 2005-210927 | A | 8/2005 |
| JP | 2006-075090 | A | 3/2006 |
| JP | 2007-075043 | A | 3/2007 |
| JP | 2007-124966 | A | 5/2007 |
| JP | 2007-189987 | A | 8/2007 |
| JP | 2008-022760 | A | 2/2008 |
| JP | 2008-206412 | A | 9/2008 |
| JP | 2008-538918 | A | 11/2008 |
| JP | 2011-045284 | A | 3/2011 |
| JP | 2012-090604 | A | 5/2012 |
| JP | 2013-179875 | A | 9/2013 |

* cited by examiner

*FIG. 6A*     *FIG. 6B*
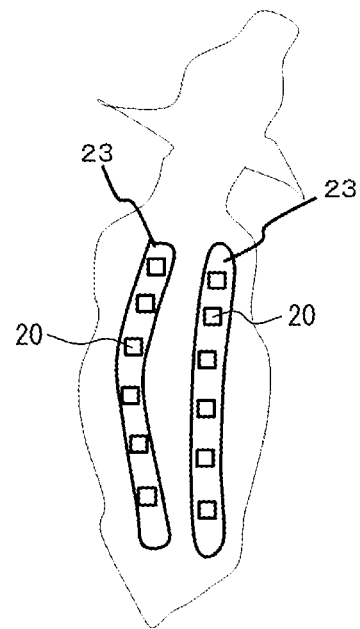
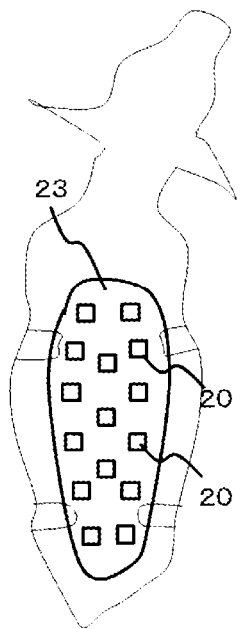
*FIG. 6C*     *FIG. 6D*
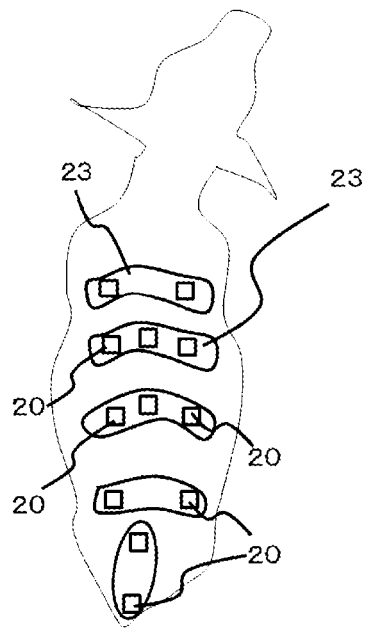
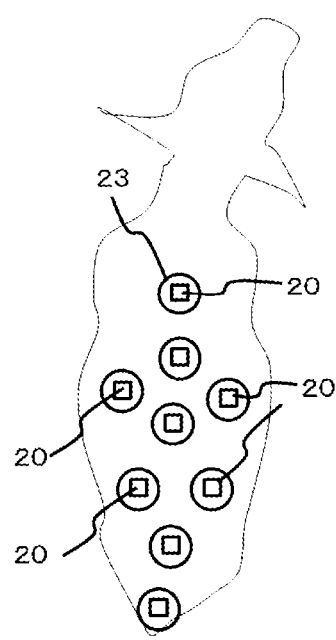

*FIG. 11*

```
Name of targeted cow:A

Mounting communication log
    8:09:00 (mounting cow, mounted cow)=(A, D1R)
    8:09:02 (mounting cow, mounted cow)=(A, D2R)

8:16:24 (mounting cow, mounted cow)=(A, D1M)
    8:16:28 (mounting cow, mounted cow)=(A, D1M)
    8:20:10 (mounting cow, mounted cow)=(A, S3M)
    8:20:13 (mounting cow, mounted cow)=(A, S3L)

8:46:03 (mounting cow, mounted cow)=(A, C1R)
    8:57:31 (mounting cow, mounted cow)=(A, C4L)

Mounting communication log
    9:09:00 (mounting cow, mounted cow)=(D, A1R)
    9:09:03 (mounting cow, mounted cow)=(D, A5L)
    9:14:45 (mounting cow, mounted cow)=(D, A2L)
    9:14:47 (mounting cow, mounted cow)=(C, A3L)
```

```
                                                                    33
┌─────────────────────────────────────────────────────────────────────┐
│ Name of targeted cow:A                                              │
│                                                                     │
│    ·Place emergency call (090-1234-5678) to veterinarian (Dr. xxx)? │
│       [ YES ]    [ NO ]                                             │
│                                                                     │
│    ·Transmit information on mounting behavior to veterinarian (Dr. xxx)? │
│       [ YES ]    [ NO ]                                             │
│                                                                     │
│    · Instruct veterinarian (Dr. xxx) to conduct artificial insemination? │
│       [ YES ]    [ NO ]                                             │
│                                                                     │
│    ·Continue to observe?                                            │
│       [ YES ]    [ NO ]                                             │
│                                                                     │
└─────────────────────────────────────────────────────────────────────┘
```

MOUNTING BEHAVIOR DETECTION SYSTEM AND DETECTION METHOD

CROSS-REFERENCE TO RELATED APPLICATIONS

This application claims priority to and the benefit of Japanese Patent Application Nos. 2015-72129, 2015-72130, 2015-72239, and 2015-72240 filed Mar. 31, 2015, the entire contents of which are incorporated herein by reference.

TECHNICAL FIELD

This disclosure relates to detection of mounting behavior or the like by domestic animals or the like.

BACKGROUND

Patent literature PTL 1 discloses detecting recumbence and standing when a cow is in heat (estrus) by communication between an RFID tag worn below a cow's abdomen and a reader/writer apparatus installed in a cattle shed. Since the reader/writer apparatus is installed in the cattle shed, however, detection is not possible during grazing.

Patent literature PTL 2 discloses detecting the mounting behavior of a cow in heat by inclination detection with an acceleration sensor. In the case of an acceleration sensor, however, it is necessary to wind a thick belt around the cow's torso to prevent erroneous detection caused, for example, by the cow shaking its skin when a horsefly or other insect approaches, or by misalignment of the acceleration sensor. The apparatus thus increases in size, placing a large burden on the cow.

Patent literature PTL 3 discloses using an inclination sensor to detect recumbence and standing when a cow is in heat. As with an acceleration sensor, however, it is necessary to wind a thick belt around the cow's torso to prevent erroneous detection caused by misalignment or the like. The apparatus thus increases in size, placing a large burden on the cow.

Patent literature PTL 4 discloses detection of heat by using a walking sensor to detect the number of steps a cow takes. As with an acceleration sensor, however, it is necessary to wind a thick belt around the cow's torso to prevent erroneous detection caused by misalignment or the like. The apparatus thus increases in size, placing a large burden on the cow.

Patent literature PTL 5 discloses detection of heat by using a motion sensor to detect the amount of activity of a cow. As with an acceleration sensor, however, it is necessary to wind a thick belt around the cow's torso to prevent erroneous detection caused by misalignment or the like. The apparatus thus increases in size, placing a large burden on the cow.

Patent literature PTL 6 discloses detection of heat by installing a reader/writer apparatus in a cattle shed and attaching a tag, such as an RFID, to a cow to detect the walking distance of the cow. Use is limited, however, since detection is not possible during grazing.

Patent literature PTL 7 discloses detection of heat by detecting movement by a cow with a movement sensor and a transmitter that transmits a signal from the movement sensor. As with an acceleration sensor, however, it is necessary to wind a thick belt around the cow's torso to prevent erroneous detection caused by misalignment or the like. The apparatus thus increases in size, placing a large burden on the cow.

Patent literature PTL 8 discloses detection of heat by using a walking sensor to detect the number of steps a cow takes. As with an acceleration sensor, however, it is necessary to wind a thick belt around the cow's torso to prevent erroneous detection caused by misalignment or the like. The apparatus thus increases in size, placing a large burden on the cow.

Patent literature PTL 9 discloses detection of heat by using a vibration sensor to detect the amount of activity of a cow. As with an acceleration sensor, however, it is necessary to wind a thick belt around the cow's torso to prevent erroneous detection caused by misalignment or the like. The apparatus thus increases in size, placing a large burden on the cow.

Patent literature PTL 10 discloses detection of heat by using a walking sensor to detect the number of steps a cow takes. As with an acceleration sensor, however, it is necessary to wind a thick belt around the cow's torso to prevent erroneous detection caused by misalignment or the like. The apparatus thus increases in size, placing a large burden on the cow.

Patent literature PTL 11 discloses detection of heat by using a pressure sensor attached to a cow's waist to detect the mounting behavior of the cow. It is not possible, however, to identify the mounting cow.

Patent literature PTL 12 discloses detection of heat by using a pressure responsive switch attached to a cow's spine to detect the mounting behavior of the cow. It is not possible, however, to identify the mounting cow.

Patent literature PTL 13 discloses the structure of a mounting fixture of a detection device for detecting the mounting behavior of a cow by using a pressure sensor attached to the cow's spine. It is not possible, however, to identify the mounting cow.

Patent literature PTL 14 discloses providing notification by light upon detecting mounting behavior of a cow with a pressure sensor attached to the cow. It is not possible, however, to identify the mounting cow.

Patent literature PTL 15 discloses the structure of a mounting fixture of a detection device for detecting the mounting behavior of a cow by using an acceleration sensor or an inclination sensor attached to the cow's backbone. However, it is necessary to wind a thick belt around the cow's torso to prevent erroneous detection caused by misalignment or the like. The apparatus thus increases in size, placing a large burden on the cow.

Patent literature PTL 16 discloses detecting recumbence and standing when a cow is in heat with a temperature sensor that detects the cattle shed temperature. Since the reader/writer apparatus is installed in the cattle shed, however, detection is not possible during grazing.

Patent literature PTL 17 discloses detecting that a cow is in heat with a temperature sensor that detects the temperature of the cow's vagina. However, the vaginal temperature cannot be measured during grazing, thereby limiting the circumstances in which this disclosure is applicable.

Patent literature PTL 18 discloses the transmission of ultrasonic waves from an ultrasonic transmitter attached to the neck of one cow to an ultrasonic receiver attached to the neck of another cow. PTL 18 discloses that upon ultrasonic waves being received by the ultrasonic receiver attached to the other cow's neck, the number of times ultrasonic waves are received is counted directly as the number of times the cow mounts (is mounted), i.e. the mounting (mounted) count. PTL 18 also discloses that electromagnetic waves or infrared rays may be used instead of ultrasonic waves. However, it is extremely difficult for the reception-enabling orientation of the ultrasonic receiver attached to the neck of the mounted cow to be matched properly with the orientation of transmission by the ultrasonic transmitter attached to the neck of the mounting cow. In particular at the time of mounting, the mounting cow lowers its head and places its chin on the back of the mounted cow. Accordingly, the mounting cow's chin blocks a signal with directivity, such as ultrasonic waves. Furthermore, the mounted cow often arches its back and lowers its head when being mounted. Therefore, the ultrasonic receiver is hidden by the mounted cow's back and cannot receive a signal with high directivity, such as ultrasonic waves. Mounting behavior cannot be detected in this case. Chin resting clearly cannot be detected either in this case.

CITATION LIST

Patent Literature

PTL 1: JP 2006-75090 A
PTL 2: JP 2007-75043 A
PTL 3: JP 2008-538918 A
PTL 4: JP H06-141385 A
PTL 5: JP 2012-90604 A
PTL 6: JP 2003-189751 A
PTL 7: JP H10-501618 A
PTL 8: JP 2008-22760 A
PTL 9: JP 2003-325077 A
PTL 10: JP 2004-337093 A
PTL 11: JP H11-32609 A
PTL 12: JP S63-192437 A
PTL 13: JP 2004-57069 A
PTL 14: JP 2000-157084 A
PTL 15: JP 2008-206412 A
PTL 16: JP 2011-45284 A
PTL 17: JP 2013-179875 A
PTL 18: JP 2005-210927 A

SUMMARY

Technical Problem

Easy detection of mounting behavior, or the like, by domestic animals, or the like, is disclosed herein.

One embodiment of this disclosure includes a mounting-side apparatus attached to the neck of a first domestic animal and configured to emit a transmission signal, and a mounted-side apparatus attached at any position from the back to the tail of a second domestic animal. A communication interface of the mounted-side apparatus emits a response signal to a communication interface of the mounting-side apparatus.

Advantageous Effect

According to an embodiment of this disclosure, mounting behavior, or the like, of domestic animals, or the like, can easily be detected.

BRIEF DESCRIPTION OF THE DRAWINGS

In the accompanying drawings:
FIG. 6A illustrates an example of the mounted-side apparatus being worn by a cow;
FIG. 6B illustrates an example of the mounted-side apparatus being worn by a cow;
FIG. 6C illustrates an example of the mounted-side apparatus being worn by a cow;
FIG. 6D illustrates an example of the mounted-side apparatus being worn by a cow;
FIG. 11 illustrates an example of a screen on the user-side apparatus in the detection system;
and
FIG. 12 illustrates an example of a screen on the user-side apparatus in the detection system.

DETAILED DESCRIPTION

The following describes an embodiment of this disclosure with reference to the drawings, which illustrate various examples. These examples may be applied to each other or modified as long as these examples do not contradict each other. Various techniques may also be added or modified as long as these examples do not contradict each other.

Figure 1:
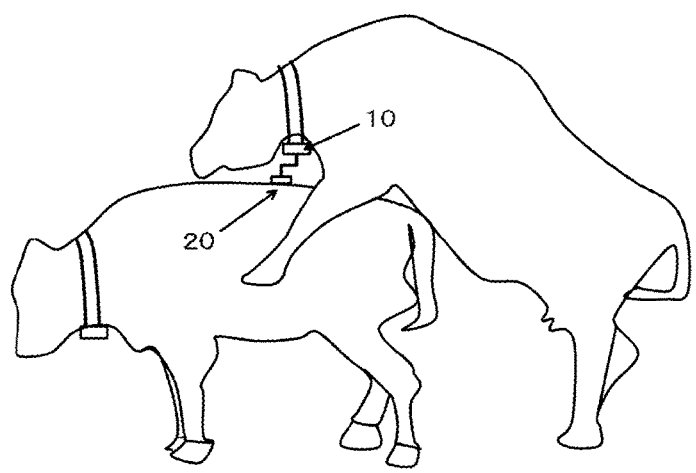
FIG. 1 is an overview of a detection system.

FIG. 1 illustrates an overview of the detection system with a usage example. Here, a mounting-side apparatus 10 is attached to the throat or neck of the mounting cow, and one mounted-side apparatus 20 is attached near the withers of the cow that is mounted. The mounting-side apparatus 10 periodically transmits electromagnetic waves. Once the mounted-side apparatus 20 faces the mounting-side apparatus 10 at an appropriate distance, such as 0 cm to 30 cm, the mounted-side apparatus 20 returns a unique ID of the mounted cow to the mounting-side apparatus 10. The unique ID is stored in the mounted-side apparatus 20. With a transmission signal received from the mounting-side apparatus 10 as a trigger (or upon receiving energy from a transmission signal), the mounted-side apparatus 20 returns the aforementioned unique ID. During mounting behavior, the area around the mounting cow's throat, neck, or dewlap often faces the mounted cow's back and the area further behind, i.e. the hips, buttocks, or tail (the head or throat not being included; in this disclosure, "faces" also includes the case of actual contact). Therefore, the mounting-side apparatus 10 and the mounted-side apparatus 20 are preferably attached at such facing positions.

A female cow in heat is also known to rest its chin on another cow's back, hips, buttocks, or the like (chin resting). In this case as well, the mounting-side apparatus 10 disposed at the throat or below the neck faces the mounted-side apparatus 20 on the back, and the mounted-side apparatus 20 returns the unique ID, stored in the mounted-side apparatus 20, of the mounted cow to the mounting-side apparatus 10. In the same way as described above, the mounted-side apparatus 20 returns the aforementioned unique ID with the reception of a signal from the mounting-side apparatus 10 as a trigger in this case as well.

In this way, the unique ID of the cow that is mounted is transmitted to the mounting-side apparatus 10 of the mounting cow, and together with the mounting cow's unique ID stored in the mounting cow's mounting-side apparatus 10, the combination of the mounting cow and the mounted cow can be detected. Accordingly, a user may be notified of the unique ID of a cow involved in mounting behavior (the mounting cow or the mounted cow) and/or of detection of a combination of cows involved in mounting behavior. In this case, the user may be notified by, for example, emission of light from a notification interface 11 such as an LED attached to the mounting-side apparatus 10 or by emission of sound from a notification interface 11 such as a buzzer.

Figure 2:
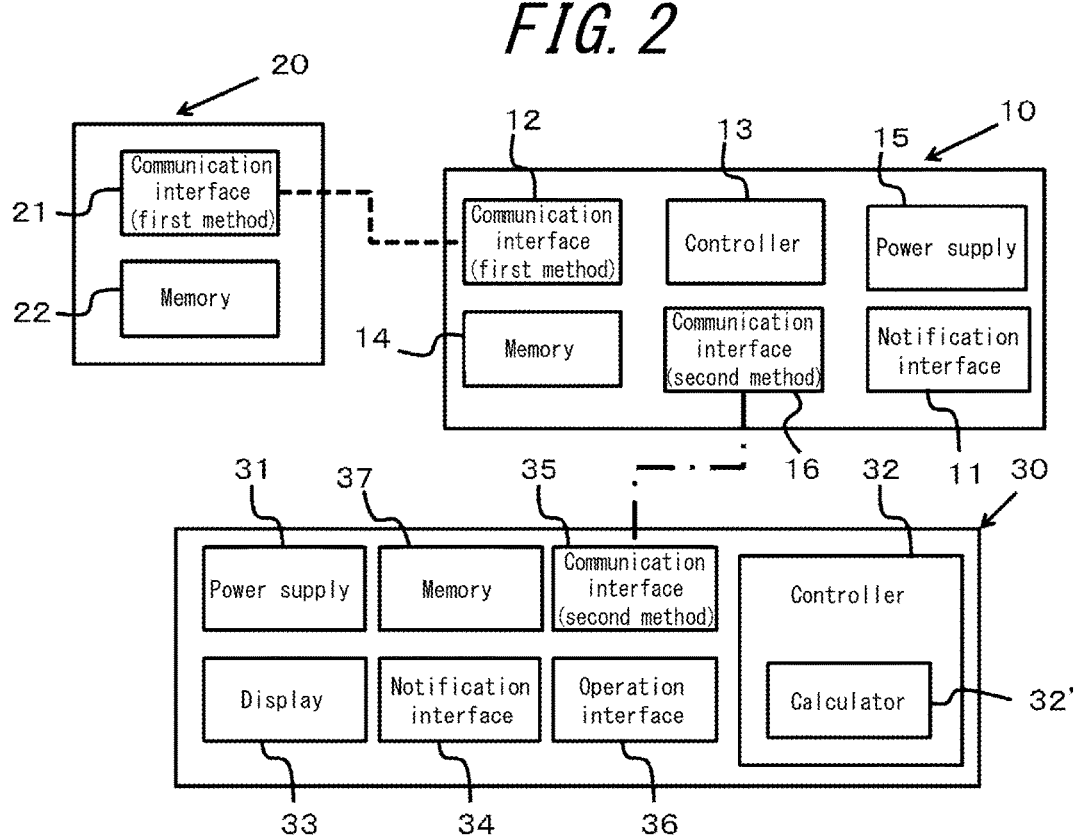
FIG. 2 is a functional block diagram of an example of the detection system.

Next, with reference to FIG. 2, an example of the configuration of the detection system is described. As illustrated in FIG. 2, the detection system according to this embodiment may include a mounting-side apparatus 10, a mounted-side apparatus 20, and a user-side terminal 30.

The mounting-side apparatus 10 emits a signal to the mounted-side apparatus 20 by a first communication method (first method). The mounting-side apparatus 10 receives a signal returned by the mounted-side apparatus 20 by the first method in response to the emitted signal. The first method may, for example, be a communication technique such as NFC (NFC-A, NFC-B, NFC-F) or a communication technique with high directivity, such as IrDA.

In the case of adopting the reader/writer apparatus used with an NFC technique as the first communication method, the mounting-side apparatus 10 may include a communication interface 12, a controller 13, a memory 14, a power supply 15, and a communication interface 16. The communication interface 12 transmits an electromagnetic wave (which may also function as an energy source for responding) as a transmission signal to the mounted-side apparatus 20 that includes a tag referred to as a passive RFID tag (mainly constituted by an antenna and a memory). The communication interface 12 may be compliant with NFC (NFC-A, NFC-B, NFC-F, or the like) for receiving a signal (response) from the RFID tag of the mounted-side apparatus 20. The memory 14 stores the unique ID of the domestic animal (female cow, calf, horse, pig) to which the mounting-side apparatus 10 is attached. The power supply 15 may use a battery (secondary cell), a fuel cell, or the like. The mounting-side apparatus 10 may (when the below-described user-side terminal 30 is provided) include a communication interface 16 that is compliant with a second communication method (for example, CDMA, LTE, WiFi, or BlueTooth® (BlueTooth is a registered trademark in Japan, other countries, or both)) for allowing communication with the user-side terminal 30. At a minimum, it suffices for the content of the transmission signal to be a request for return of the unique ID stored in the memory of the mounted-side apparatus 20.

Instead of an NFC technique, IrDA may of course also be adopted for the first method. In this case, it suffices for the communication interface 12 of the first method to include an optical emitter and an optical detector that respectively emit and detect infrared rays. IrDA has the advantage of a greater communicable range (approximately 30 cm to 1 m) than NFC. Furthermore, instead of emission and detection of infrared rays, pulsed laser light with a specific wavelength may be emitted and detected.

The solid angle at which communication is possible with any of NFC, IrDA, and laser light is small, and the communication interfaces need to be in a nearly facing state. Therefore, in an embodiment of this disclosure, a communication method with high directivity may be adopted on purpose to reduce the probability of erroneous detection. Such an embodiment has the advantage of making it easy to reduce the chance of erroneous detection whereby the communication interfaces end up communicating regardless of mounting behavior or chin resting.

The communication interface 12 of the first method of the mounting-side apparatus 10 repeats transmission at approximately one-second intervals, for example. Transmission may, of course, be more frequent than once per second. Upon receiving a response while transmitting once per second, the communication interface 12 subsequently repeats transmission over shorter cycles of one transmission approximately every 0.1 s to 0.3 s until at least a certain time (for example, at least 4 s) from the last response (mounting detection time+at least a certain time). Such transmission is for accurate measurement of the continuous mounting time while reducing power consumption when mounting is not taking place. The setting of this cycle may of course be changed in various ways.

The communication interface 16 of the second method may be compliant with CDMA, LTE, WiFi, or BlueTooth®, for example. The second method preferably has low directivity and a communication distance that allows transmission of radio waves from within the grazing land of the pasture to outside the grazing land. For example, it suffices for the communication distance to exceed approximately 200 meters. This communication distance may be shorter when one or more relay base stations are installed in the grazing land. For example, the communication distance may be approximately several dozen meters. When using an electric pasture fence (to which a high-voltage, low-current pulsed wave is typically applied), a power line for a relay base station may further be strung along the pasture fence.

The mounted-side apparatus 20 may be configured by a tag that uses a method corresponding to the first method of the mounting-side apparatus 10, such as an NFC technique. The mounted-side apparatus 20 may include a communication interface 21 and a memory 22. It suffices for a unique ID for at least each domestic animal targeted for attachment to be written in the memory 22. When the first method is NFC, the communication interface 21 may adopt a tag capable of communication in RFID communication mode. In this case, the structure for attachment to the back of a cow or other domestic animal can be simplified, since no power supply, such as a battery, is necessary. A battery may, of course, be provided and used as a power supply to perform communication. When using IrDA or pulsed laser light as the first method, it suffices for the communication interface 21 to include a corresponding optical detector and optical emitter. A power supply for driving the optical emitter may, of course, be further provided.

The user-side terminal 30 may not be necessary in some cases but does increase convenience. The user-side terminal 30 may include a power supply 31, a controller 32 (calculator 32'), a display 33, a notification interface 34, a communication interface 35, an operation interface 36, and a memory 37. The apparatuses that can most easily include these components are a PC, a smartphone, a tablet, or the like with application software that can run on these devices. An outdoor-type smartphone that is resistant to moisture, dirt, and dust during work in the barn is preferably used.

The controller 32 controls overall operations of the user-side terminal 30. In particular, the calculator 32' calculates a mounting count (mounting length of time) or a mounted count (mounted length of time) for each cow and compares these calculation results with respective thresholds. Details are provided below.

The display 33 may be capable of displaying information on the below-described mounting count or the like, a selection screen or the like with options such as whether to contact a veterinarian, and/or a screen for when an e-mail or phone call is received.

The notification interface 34 may provide notification when the mounting count, mounted count, or the like exceeds a predetermined threshold (if such functions are included) and may provide notification when an e-mail or a phone call is received. Such a notification may be provided in a variety of well-known ways, such as by sound, light, vibration, or text display. In particular when it is strongly suspected that a cow is in heat, and that the cow should be inseminated immediately on the basis of the elapsed time from the start of heat, the user may be notified in a form with a stronger impact than usual. For example, notification may be provided with a stronger impact than usual by using different levels of volume or by using different intensities or the like of light. Alternatively, if one type of notification is normally provided (for example, only by sound), notification may be provided by a plurality of methods in the case of an emergency, such as sound and light, sound and vibration, or the like.

The communication interface 35 of the second method can preferably communicate with the above-described communication interface 16 by a method compliant with any one or more of CDMA, LTE, WiFi, or BlueTooth®, for example.

A variety of techniques for receiving operations, such as operation keys or a touch panel, may be used in the operation interface 36.

The memory 37 stores information, for example, related to the mounting behavior and acquired through the communication interface 35, or may be used as a storage area during various calculation processing or the like. As a phone book function, the memory 37 may also include information on particular veterinarians and artificial inseminators, records on the physical condition and on the past heat of each cow (such as records of the past two heats and the record of the time of insemination for the past year), and the like.

Figure 3:
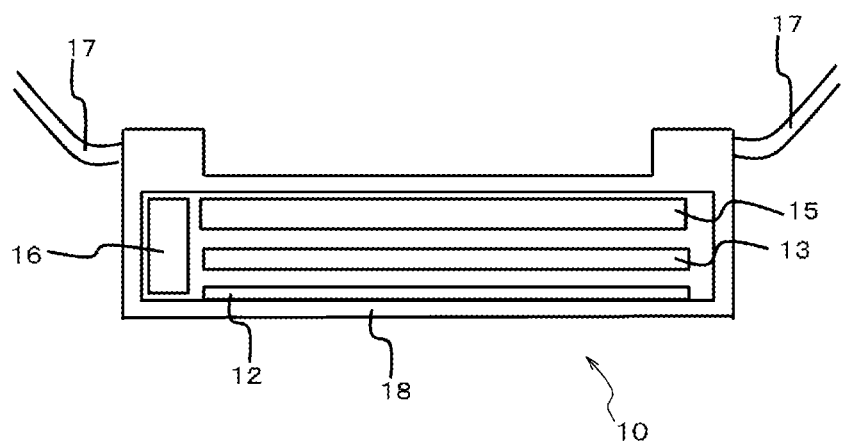
FIG. 3 is a cross-sectional diagram schematically representing an example of a mounting-side apparatus.
Figure 4:
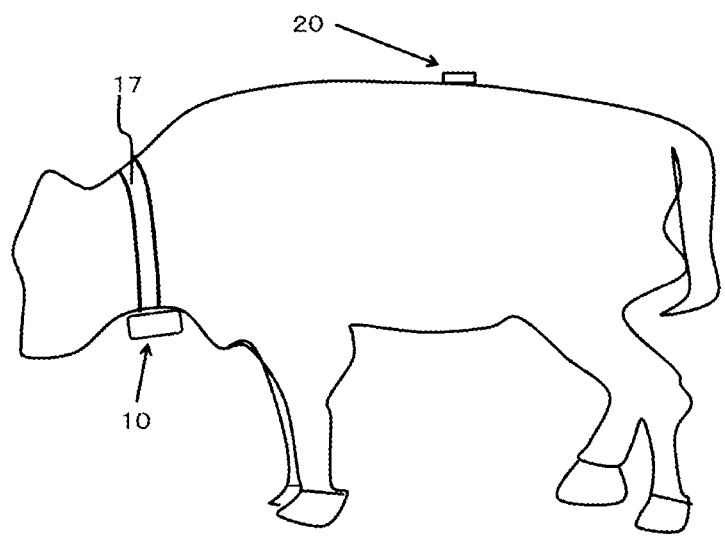
FIG. 4 illustrates an example of the mounting-side apparatus and the mounted-side apparatus being worn by a cow.
Figure 5:
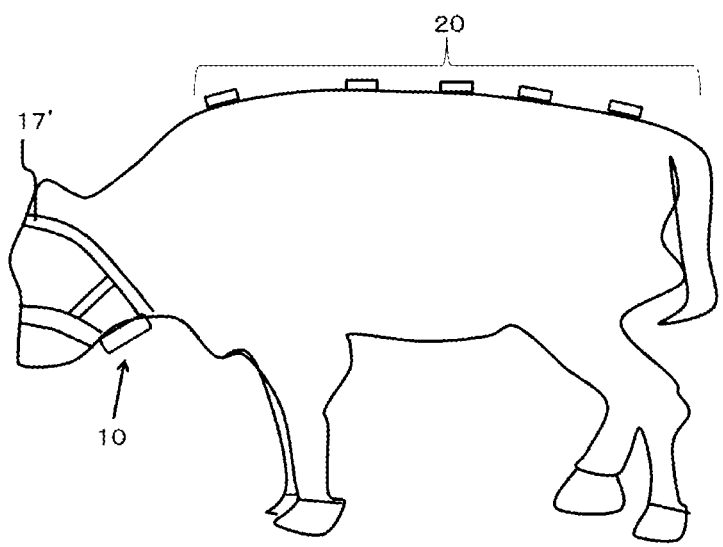
FIG. 5 illustrates an example of the mounting-side apparatus and the mounted-side apparatus being worn by a cow.

Next, with reference to FIGS. 3 through 5, several examples of the structure of the mounting-side apparatus 10 are described. As illustrated in FIG. 3, an antenna of the communication interface 12 is provided in a waterproof housing 18 as an example of the case of using an NFC technique for the first method. The antenna may be disposed on the side that is closer to the mounted cow during mounting behavior. When the first method is IrDA, the optical emitter and optical detector may also be disposed on the side closer to the mounted cow during mounting behavior. Furthermore, a circuit board 13 may be disposed inside the housing 18 and may configure a portion or all of the controller 13 and the memory 14. A lithium-ion or other type of power supply 15, for example, is also provided. An antenna for the communication interface 16 of the second method may also be provided. While not illustrated, a display, a notification interface, and the like may also be provided.

FIG. 3 illustrates an example of the structure of the mounting-side apparatus 10. In the example in FIG. 3, a holder 17 is attached to the outside of the housing 18 of the mounting-side apparatus 10. The holder 17 is, for example, a collar-type holder as illustrated in FIG. 4. Alternatively, the holder 17 may, for example, be a bridle-type holder 17' as illustrated in FIG. 5. These holders may be configured by the typical constituent members of bridles or the like for domestic animals, such as rubber, leather, cloth, rope, cords, or the like, and preferably have durability and flexibility. A mechanism for adjusting the length may be used in each of the holder 17 and bridle 17'. When worn, the holder 17 and the bridle 17' need not be tightened until squeezing the domestic animal's neck but rather may have a length that leaves a slight gap from the domestic animal's neck. While not illustrated, the holder 17 or the bridal 17' may instead be a crossed belt that wraps around from the domestic animal's neck to the front legs or may be like a girth for a horse.

One mounted-side apparatus 20 is provided in FIG. 4, whereas a plurality of mounted-side apparatuses 20 are provided in FIG. 5. When constituted by a loop antenna and a memory, for example as illustrated in FIG. 2, the mounted-side apparatus 20 may be a chip, called an NFC chip, measuring approximately 3 mm to 1 cm both wide and long. In this case, by providing a plurality of mounted-side apparatuses 20 on the back of the domestic animal or the like as illustrated in FIGS. 6A-6D, the probability of mounting not being detected because of misalignment at the time of mounting is reduced.

FIGS. 6A-6D illustrate four examples for arrangements of mounted-side apparatuses 20. In FIG. 6A, mounted-side apparatuses 20 are aligned on either side of a domestic animal's backbone. Here, the bands on the left and right indicate holding members 23 that hold the mounted-side apparatuses 20. In this way, the mounted-side apparatuses 20 held by the holding members 23 are disposed not only on the backbone but also to the left and right, making it easier to detect chin resting. The band-shaped holding members 23 may, for example, be constituted by cloth or rubber and may be adhered to the domestic animal's back by, for example, application of adhesive. The adhesive is preferably a biocompatible medical adhesive (for example, a cyanoacrylate adhesive). Partial adhesion to the cow or horse's hair, however, is sufficient, and after a certain amount of time passes, the holding member 23 falls off with the adhesive at the time of hair loss, or the holding member 23 is collected every 21 days in accordance with the heat cycle. Therefore, regardless of type, the adhesive has little adverse effect on the domestic animal's body. When the mounted-side apparatus 20 is a type not using a battery, the mounted-side apparatus 20 need not be removed from the domestic animal every time in the detection system. If a battery is necessary, a configuration may be adopted for removal of the battery alone.

In these holding members 23, six mounted-side apparatuses 20 per side are adhered on the left and right in FIG. 6A, for a total of 12 apparatuses. According to this configuration, the neck position of the mounting domestic animal and variation in the posture at the time of mounting can be detected easily, as can the position on the back upon chin resting and variation in the position of the chin. FIG. 6B illustrates a holding member 23 provided with a cover and a belt. The mounted-side apparatuses 20 are arranged on the cover, and the cover may be a member constituted by cloth, rubber, a net, or the like that covers a wide region on the back. The belt may be a member that is attached to the left and right of the cover and encircles the domestic animal's stomach. In the case of FIG. 6B, the mounted-side apparatus 20 may also be disposed on the portion of the withers corresponding to the backbone of the cow. The mounting-side apparatus 10 attached to a cow's neck is often disposed directly in the center, without deviating to the left or the right of the domestic animal. Hence, disposing the mounted-side apparatuses 20 in this way on the backbone makes mounting behavior less likely to be missed. Adhesive may of course be used instead of a belt, as in FIG. 6A.

In FIG. 6C, horizontally extending bands are disposed across the backbone. Here, adhesive or a belt may be used for the material and structure of the holding members 23, as in FIGS. 6A and 6B. In FIG. 6C, mounted-side apparatuses 20 are also disposed along the backbone at the tail head. Disposing mounted-side apparatuses 20 at the tail head as well in this way is effective when, for example, not only female cows but also male calves are grazing in the same pasture area. In other words, when the mounting-side apparatus 10 is attached to a male calf, the mounting-side apparatus 10 of the calf might not reach the withers of a female cow capable of giving birth, because the calf is short. Accordingly, by attaching the mounted-side apparatuses 20 from the female cow's hips or buttocks to near the tail, such as the tail head, the behavior of mounting (being mounted) can be detected more easily.

In FIG. 6D, the chip-shaped mounted-side apparatuses 20 are fixed in place using holding members 23 constituted by adhesive. In other words, in FIG. 6D, the holding member 23 itself may be adhesive. Here, a plurality of mounted-side apparatuses 20 is individually attached at positions likely to face the mounting-side apparatus 10, such as the domestic animal's back, hips, or tail. Instead of only being constituted by adhesive, the holding member 23 may be a slice of acrylic, PET, or the like which has adhesive attached to the back side and on which a chip is fixed. Adhesive may be used on the back face of the slice, as above, when attaching the slice of acrylic or the like to a cow's tail or skin. The holding member 23 may of course also be an adhesive sheet. The holding member 23 may also be an adhesive bandage or surgical tape onto which the chip of the mounted-side apparatus 20 is attached. Such a structure is simple and inexpensive. The chip and hardened adhesive may be covered with an element such as urethane gel. By doing so, the risk of the mounted-side apparatus 20 or holding member 23 catching or scratching the lower abdomen or chin of the domestic animal during mounting or chin resting can be reduced. The holding member 23 may thus include a cover.

FIGS. 7 through 12 are examples of display screens on the display 33 of the user-side terminal 30 displaying information, collected from the mounting-side apparatus 10, on the mounting behavior of each domestic animal. With reference to the screen examples, the information on mounting behavior and algorithms for determining heat are described in order.

Figure 7:
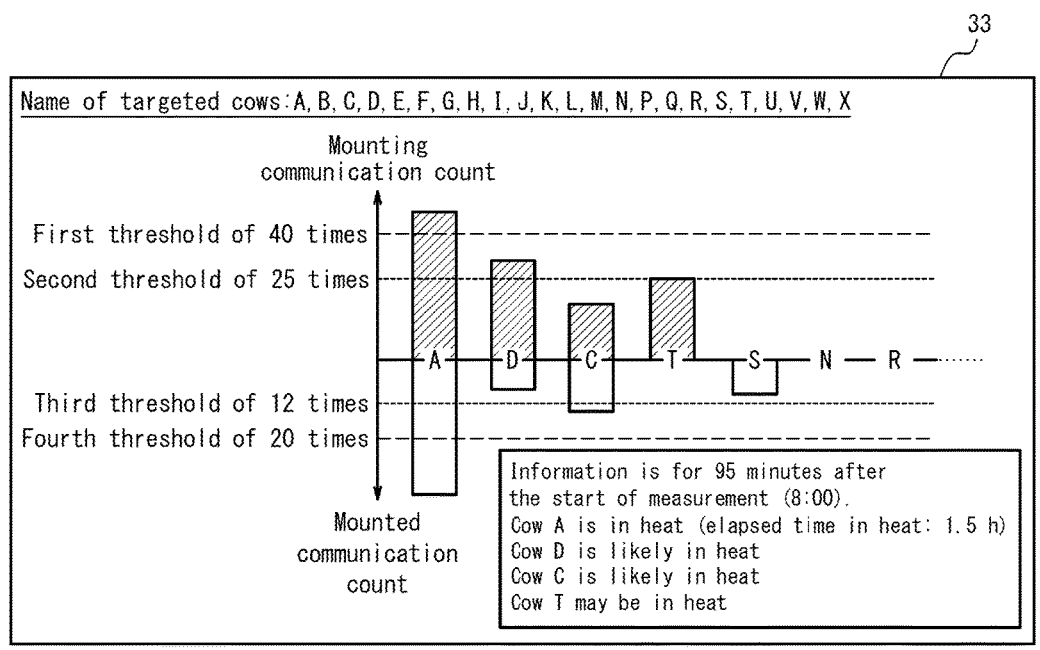
FIG. 7 illustrates an example of a screen on a user-side apparatus in the detection system.

The figures illustrate the results of collecting data from 8 o'clock in the morning (the start of grazing) until about 9:30 for a plurality of cows in the same pasture area. The leftmost bar for cow A in the graph in FIG. 7 is now described. The bar for cow A indicates the total of the number of times the mounting-side apparatus 10 of cow A communicated with the mounted-side apparatus 20 of another cow (mounting communication count) and the number of times the mounted-side apparatus 20 of cow A communicated with the mounting-side apparatus 10 of another cow upon being mounted by the other cow (mounted communication count). Here, the mounting communication count of cow A exceeds a first threshold (40 times). The mounted communication count exceeds a fourth threshold of 20 times. The determination of the cow being in heat may be made when the mounting communication count exceeds the first threshold, or when the mounting communication count exceeds the first threshold and the mounted communication count exceeds the fourth threshold.

Cow D is described next. The mounting communication count for cow D exceeds a second threshold of 25 times. In this case, it is determined that cow D is likely to be in heat. The mounted communication count for cow D does not exceed a third threshold, but a determination of the cow likely being in heat may be made when the mounting communication count exceeds the second threshold and the mounted communication count exceeds the third threshold. As for cow C, the mounting communication count does not exceed any of the thresholds, but the mounted communication count exceeds the third threshold of 12 times. In this case, it is determined that cow C is likely to be in heat. Neither the mounting communication count nor the mounted communication count for cow T exceeds any of the thresholds, but since the mounting communication count matches the second threshold, it is determined that cow T may be in heat.

This bar graph is designed so that as the total communication count of a cow is higher, i.e. as the cow is more likely to be in heat, the bar is displayed further to the left of the screen. Comments regarding the probability of heat are also displayed within a box for cows that are in heat or may be in heat. Such comments are not essential, and while looking at the bar graph, the user may confirm whether cows are in heat based on personal experience and the characteristics of each cow. For cows determined to be in heat, the elapsed time from the observation of the possibility of being in heat is displayed. The reason for displaying the elapsed time in this way is that it is best to inseminate cows between 0 hours and 24 hours from the onset of heat, preferably between 5 hours and 16 hours, and more preferably between 8 hours and 13 hours. Furthermore, issues such as the thresholds and which of the mounting communication count and mounted communication count to give the most weight to are also affected by individual variation between cows. Hence, the conditions for identification may be settable for each user, and the user may be allowed to set the conditions for each cow.

Figure 8:
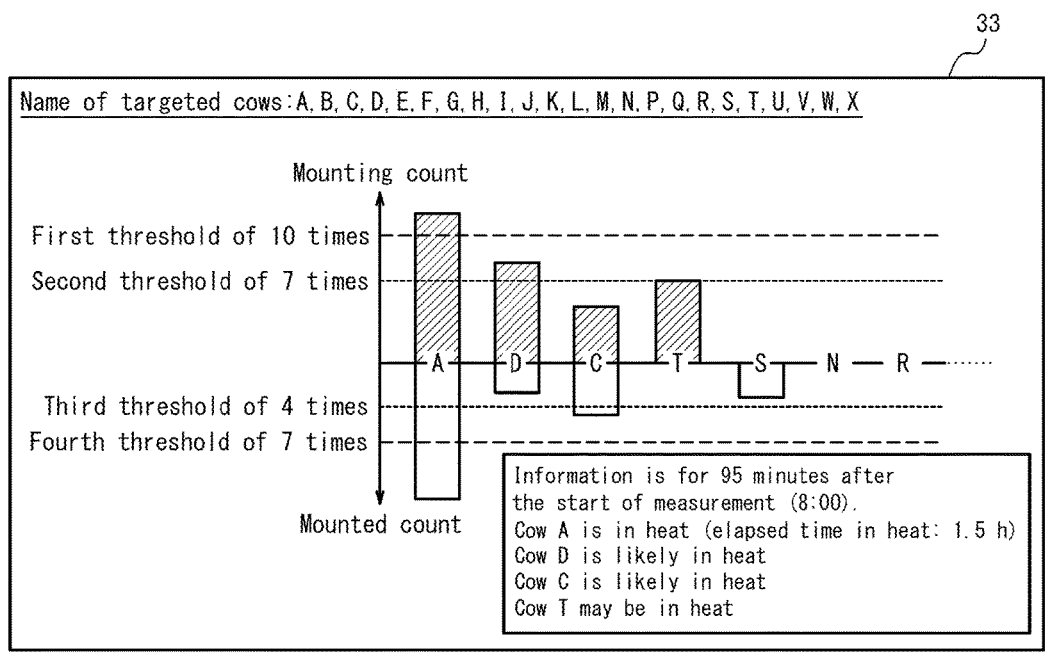
FIG. 8 illustrates an example of a screen on the user-side apparatus in the detection system.

The leftmost bar for cow A in the graph in FIG. 8 is now described. The bar for cow A indicates the total of the mounting count derived from the number of times the mounting-side apparatus 10 of cow A communicated with the mounted-side apparatus 20 of another cow and the mounted count derived from the number of times the mounted-side apparatus 20 of cow A communicated with the mounting-side apparatus 10 of another cow upon being mounted by the other cow. Here, the mounting count of cow A exceeds a first threshold (10 times). The mounted count exceeds a fourth threshold of seven times. The determination of the cow being in heat may be made when the mounting count exceeds the first threshold, or when the mounting count exceeds the first threshold and the mounted count exceeds the fourth threshold. In other words, the manufacturer or the user may be allowed to set a variety of determination conditions in accordance with factors such as the breeding environment, individual differences, and/or the type of domestic animal.

Cow D is described next. The mounting count for cow D exceeds a second threshold of seven times. In this case, it is determined that cow D is likely to be in heat. The mounted count for cow D does not exceed a third threshold of four times, but a determination of the cow likely being in heat may be made when the mounting count exceeds the second threshold and the mounted count exceeds the third threshold. As for cow C, the mounting count does not exceed any of the thresholds, but the mounted count exceeds the third threshold of four times. In this case, it is determined that cow C is likely to be in heat. Neither the mounting count nor the mounted count for cow T exceeds any of the thresholds, but since the mounting count matches the second threshold, it is determined that cow T may be in heat.

Here, calculations may be made using a variety of algorithms to calculate the mounting (mounted) count from the mounting (mounted) communication count and to determine heat. Calculation examples using several algorithms are listed below.

During mounting behavior of a cow, the mounting cow continuously mounts the mounted cow for an average length of approximately two seconds to eight seconds. Consequently, the continuous mounting (mounted) time is two seconds to eight seconds on average during one episode of mounting behavior.

Therefore, for example when communication occurs between the mounting-side apparatus 10 of cow A and the mounted-side apparatus 20 of cow B a plurality of times, and the time from the first communication to the last communication (for example, six seconds) is within the aforementioned average continuous time of two seconds to eight seconds, the mounting count of cow A and the mounted count of cow B may each be incremented by one. In this case, one or more mounting-side apparatuses 10 may be arranged on cow A, and one or more mounted-side apparatuses 20 may be arranged on cow B. In other words, both the first communication and the last communication may be between any of the mounting-side apparatuses 10 on cow A and any of the mounted-side apparatuses 20 on cow B. In greater detail, when the first detected communication is with the mounted-side apparatus 20 disposed on the tail of the mounted cow B, communication occurs four seconds later with the mounted-side apparatus 20 on the back of the mounted cow B, and no subsequent communication occurs, then the continuous mounting time is taken to be four seconds, and the mounting (mounted) count is incremented by one.

Alternatively, as a simpler approach, when communication occurs between the mounting-side apparatus 10 of cow A and the mounted-side apparatus 20 of cow B a plurality of times, and the time from the first communication to the next communication (for example, three seconds) is within the aforementioned average continuous time of two seconds to eight seconds, the counts may similarly be incremented by one. As in the above example, communication may be with any of the mounted-side apparatuses 20 of the same cow. Accordingly, whereas a different ID is assigned to the mounted-side apparatus 20 for each cow, it poses no problem to assign the same ID to the mounted-side apparatuses 20 of the same cow. The memory (RFID chip) of the mounted-side apparatus 20 can thus be written to with a simple operation.

Conversely, for example when an initial communication occurs, and the time until the next communication is outside of the aforementioned average continuous time of two seconds to eight seconds, or when only an initial communication occurs without any next communication, the mounting behavior may be counted as zero. In this case, however, the chin resting count may be incremented by one. The reason is that communication detected by average chin resting is either one-time communication or has an extremely short time span. Since chin resting is also one index of heat, the determination of heat may include instances of chin resting.

As part of mounting behavior, a mounting cow exhibits behavior similar to chin resting by first resting its face by the mounted cow's buttocks or tail. At this time, when the mounted cow shows no signs whatsoever of heat, the mounted cow may refuse to be mounted and run away. In this case, communication is only detected once. Accordingly, in this case, chin resting (receipt of chin resting) may be counted once, without counting the mounting. A cow with a high chin resting count may be in heat, whereas it is often the case that a cow with a low mounted count but a high count of receipt of chin resting is refusing to be mounted. It may be determined that such a cow is likely not in heat.

On the other hand, when a mounted cow shows signs of being in heat, then upon chin resting or similar behavior, the mounted cow either remains relatively still and tolerates the mounting cow behind the mounted cow or exhibits gentle behavior such as escaping the subsequent mounting by walking a few steps forward during the mounting.

After chin resting, which is the initial step of mounting behavior, or after similar behavior, the mounting cow kicks the ground with its front legs and stands up. At the same time, the mounting cow's body shifts forward, from the tail towards the head of the mounted cow. Consequently, among a plurality of mounted-side apparatuses 20 attached to the same cow, communication with the mounted-side apparatus 20 attached by the buttocks or tail of the mounted cow is first detected. Communication with a mounted-side apparatus 20 further forward is detected next. Accordingly, the mounting (mounted) count may be incremented by one also when the position of the mounted-side apparatus 20, among the plurality of mounted-side apparatuses 20, that communicates moves forward from the back. When mounting is finished, the mounting cow's body moves so as to shift towards the back of the mounted cow. Detecting such a shift is also useful for mounting detection. In other words, the mounting (mounted) count may be incremented by one also when the mounted-side apparatus 20 that communicates first is disposed on the back, and subsequently communication is exchanged with a mounted-side apparatus 20 disposed on the tail. However, when communication is detected in the order of the tail, back, and tail during the aforementioned average mounting detection time, the mounting count is prevented from being increased by two. In this case, during the aforementioned average mounting detection time, even if communication is exchanged with three or more mounted-side apparatuses 20, the count is increased by one, not by two or three. In other words, counting is not redundant. When following such an algorithm, it suffices for the IDs allocated to the mounted-side apparatuses 20 to differ between cows, and for a different ID to be allocated at each position on the back, tail, and the like of the same cow. For example, when listed in the order of the left side, atop the backbone, and the right side of the back from the tail towards the head of cows A and B, the IDs may be A-1L, A-2L, A-3L, . . . ; A-1M, A-2M, A-3M, . . . ; and A-1R, A-2R, A-3R, . . . ; and B-1L, B-2L, B-3L, . . . ; B-1M, B-2M, B-3M, . . . ; and B-1R, B-2R, B-3R . . . for cow B.

Figure 9:
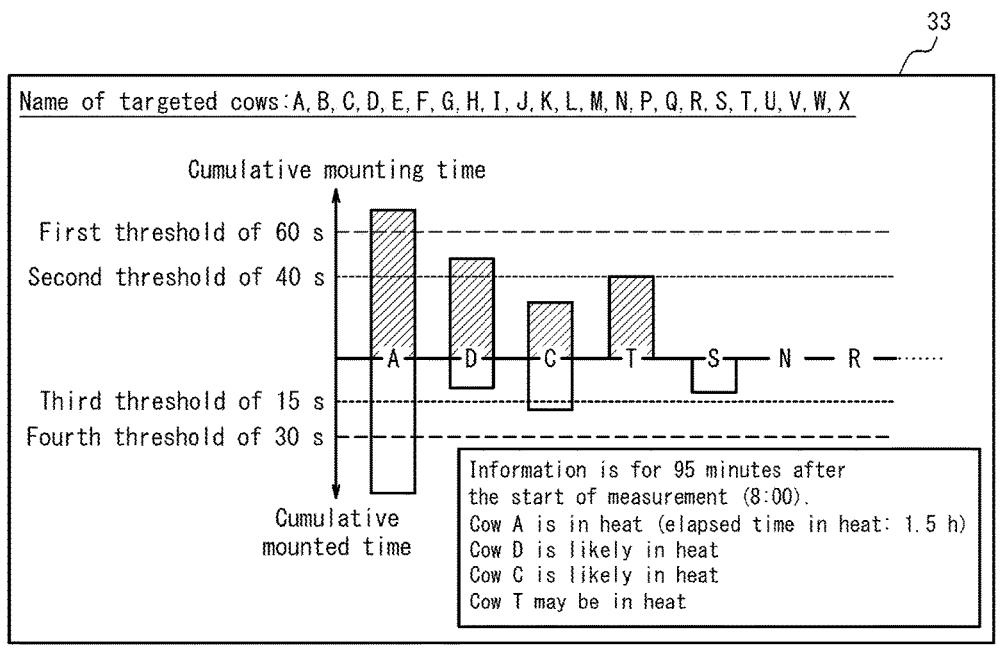
FIG. 9 illustrates an example of a screen on the user-side apparatus in the detection system.

The leftmost bar for cow A in the graph in FIG. 9 is now described. The bar for cow A indicates the cumulative mounting time derived from the length of time that the mounting-side apparatus 10 of cow A communicated with the mounted-side apparatus 20 of another cow and the cumulative mounted time derived from the length of time that the mounted-side apparatus 20 of cow A communicated with the mounting-side apparatus 10 of another cow upon being mounted by the other cow. Here, the cumulative mounting time for cow A exceeds a first threshold of 60 seconds. The cumulative mounted time exceeds a fourth threshold of 30 seconds. The determination of the cow being in heat may be made when the cumulative mounting time exceeds the first threshold, or when the cumulative mounting time exceeds the first threshold and the cumulative mounted time exceeds the fourth threshold. Cow D is described next. The cumulative mounting time for cow D exceeds a second threshold of 40 seconds. In this case, it is determined that cow D is likely to be in heat. The cumulative mounted time for cow D does not exceed a third threshold of 15 seconds, but a determination of the cow likely being in heat may be made when the cumulative mounting time exceeds the second threshold and the cumulative mounted time exceeds the third threshold. As for cow C, the cumulative mounting time does not exceed any of the thresholds, but the cumulative mounted time exceeds the third threshold of 15 seconds. In this case, it is determined that cow C is likely to be in heat. Neither the cumulative mounting time nor the cumulative mounted time for cow T exceeds any of the thresholds, but since the cumulative mounting time matches the second threshold, it is determined that cow T may be in heat.

Here, calculations may be made using a variety of algorithms to calculate the continuous mounting (mounted) time and the cumulative mounting (mounted) time from the mounting (mounted) communication count and to determine heat. Calculation examples using several algorithms are listed below.

As described above, the continuous mounting (mounted) time is two seconds to eight seconds on average during one episode of mounting behavior. Accordingly, the simplest approach is to increment by five seconds, which is the center value of the average mounting time, when communication occurs once or a plurality of times in an interval of two seconds to eight seconds.

Alternatively, from two seconds to eight seconds, the elapsed time from the first communication to the last communication may be recorded as the continuous mounting (mounted) time. Accumulating each continuous mounting (mounted) time for a plurality of mountings yields the cumulative mounting (mounted) time. In other words, the likelihood of heat is thought to be higher as the cumulative mounting time is longer, and the likelihood of heat is also thought to be higher as the cumulative mounted time is longer.

Conversely, for example when an initial communication occurs, and the time until the next communication is outside of the aforementioned average continuous time of two seconds to eight seconds, or when only an initial communication occurs without any next communication, the continuous mounting time may be counted as zero.

As part of mounting behavior, a mounting cow exhibits behavior similar to chin resting by first resting its face by the mounted cow's buttocks or tail. At this time, when the mounted cow shows no signs whatsoever of heat, the mounted cow may refuse to be mounted and run away. On the other hand, when a mounted cow shows signs of being in heat, then upon chin resting or similar behavior, the mounted cow either remains relatively still and tolerates the mounting cow behind the mounted cow or exhibits gentle behavior such as escaping the subsequent mounting by walking a few steps forward during the mounting.

After behavior similar to chin resting, which is the initial step of mounting behavior, the mounting cow kicks the ground with its front legs and stands up. At the same time, the mounting cow's body shifts forward, from the tail towards the head of the mounted cow. Consequently, among a plurality of mounted-side apparatuses 20 attached to the same cow, communication with the mounted-side apparatus 20 attached by the buttocks or tail of the mounted cow is first detected. Communication with a mounted-side apparatus 20 further forward is detected next. Accordingly, when the position of the mounted-side apparatus 20, among the plurality of mounted-side apparatuses 20, that communicates moves forward from the back, the difference in time between the communication time with the mounted-side apparatus 20 at the back (such as 8:25:00) and the communication time with the mounted-side apparatus 20 at the front (such as 8:25:03), i.e. a difference of three seconds, may be counted as the continuous mounting (mounted) time.

When mounting is finished, the mounting cow's body shifts towards the back of the mounted cow. Detecting such a shift is also useful for mounting detection. In other words, suppose that the communication time with the initially communicating mounted-side apparatus 20 disposed on the back is, for example, 8:25:00. Subsequently, suppose that the communication time with the mounted-side apparatus 20 disposed on the tail is, for example, 8:25:04. In this case, the difference in time (four seconds) may be counted as the continuous mounting (mounted) time. However, when communication is detected in the order of the tail, back, and tail during the aforementioned average mounting detection time, the cumulative mounting time is prevented from being counted twice by taking the difference between the initial and final communication times at the tail as the continuous mounting time. When following such an algorithm, it suffices for the IDs allocated to the mounted-side apparatuses 20 to differ between cows, and for a different ID to be allocated at each position on the back, tail, and the like of the same cow. For example, when listed in the order of the left side, atop the backbone, and the right side of the back from the tail towards the head of cows A and B, the IDs may be A-1L, A-2L, A-3L, . . . ; A-1M, A-2M, A-3M, . . . ; and A-1R, A-2R, A-3R, . . . ; and B-1L, B-2L, B-3L, . . . ; B-1M, B-2M, B-3M, . . . ; and B-1R, B-2R, B-3R . . . for cow B.

Figure 10:
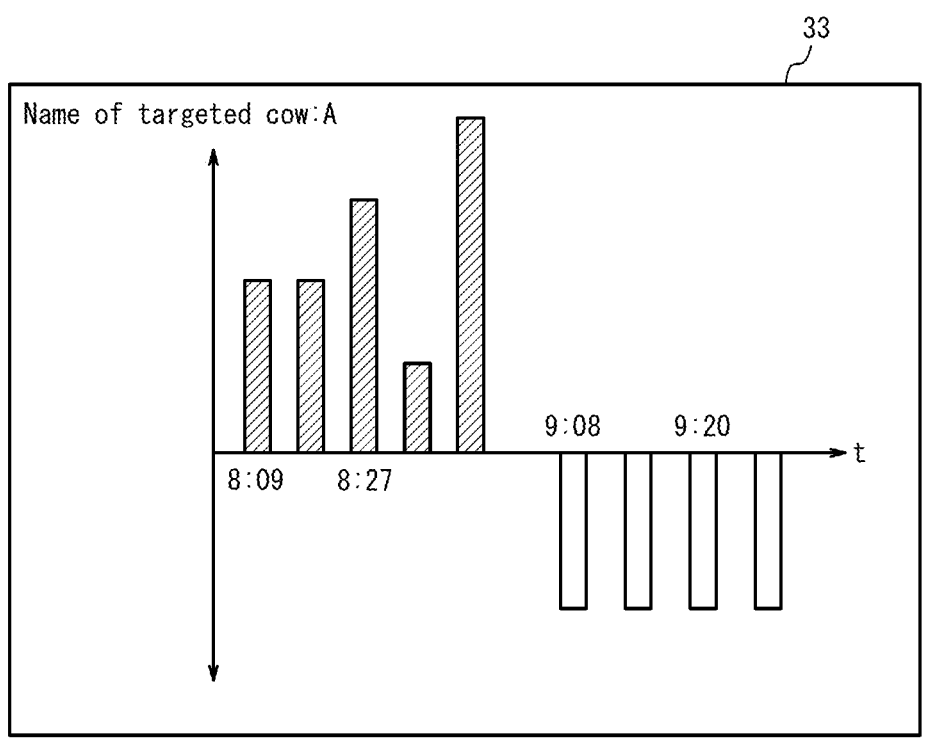
FIG. 10 illustrates an example of a screen on the user-side apparatus in the detection system.

Next, using FIG. 10, an example displaying a graph that illustrates the details on the heat behavior of cow A is described. Here, a configuration may be adopted to display the details on cow A illustrated in FIG. 10 upon touching the bar of cow A in FIGS. 7 through 9. In this case, the operation interface 36 may be a mouse of a PC or a touch panel.

As illustrated in FIG. 10, the vertical axis represents the amount of activity of mounting behavior occurring between the start of measurement at 8 o'clock and the current time of 9:30, and the horizontal axis represents time. The amount of activity may, for example, be the above-described mounting communication count in the positive direction and the above-described mounted communication count in the negative direction, or may be the mounting (mounted) count, the cumulative mounting (mounted) time, the chin resting (receipt of chin resting) count, or the like instead of the mounting (mounted) communication count. In the case of cow A, mounting behavior is detected between 8 o'clock and 9 o'clock, and incidents of being mounted are observed from about 9 o'clock. Cow A thus exhibits an acute state of heat. Since the elapsed time from the start of heat is approximately 1.5 hours, observation may be continued on the basis of a graph such as this one until the suitable time slot for insemination (for example, 4 hours to 12 hours from the start of heat, more preferably 6 hours to 10 hours from the start of heat).

FIG. 11 displays an example of details on the combination of communication logs, recorded in the memory of the mounting-side apparatus 10, for the mounting animal and the mounted animal. A configuration may also be adopted for these details to be displayed by operation of the operation interface 36 of the user-side terminal 30. The mounting communication records are accumulated in the mounting-side apparatus 10 with such logs. Each time a mounting communication log is recorded in this way, log information may be transmitted from the mounting-side apparatus 10 to the user-side terminal 30 through the communication interface 16 of the second method. The log information may be transmitted to the user-side terminal 30 once approximately every 5 minutes or 10 minutes regardless of whether mounting behavior is detected (regardless of communication). Alternatively, the trigger for transmitting the log information may be one detection of mounting behavior or a certain number of detections of mounting behavior. In this case, the communication interface 16 of the second method may be activated only when necessary and need not be continually on standby, as with a mobile phone or the like, thus contributing to reduced power consumption.

Next, FIG. 12 illustrates an example of displaying a screen for selecting the subsequent action to take for target cow A. Here, four actions often taken after confirmation of heat are displayed as choices. The four choices are (1) whether to make an emergency call to a veterinarian, (2) whether to transmit mounting behavior information to a veterinarian, (3) whether to instruct a veterinarian to conduct artificial insemination, and (4) whether to continue observation. The contact information for the veterinarian or the like in (1) through (3) may be the telephone number or e-mail address of a pre-registered veterinarian, of an artificial inseminator, or of an employee on the pasture with authority over insemination. Configurations allowing selection of only one or of a plurality of these choices may be adopted.

The terms mounting-side apparatus and mounted-side apparatus are used in this disclosure and in the claims, but the domestic animals are not limited to cows in the scope of this disclosure. Furthermore, behavior is not limited to mounting in the scope of this disclosure. The mounting-side apparatus includes an apparatus on the animal that mounts or exhibits chin resting, and the mounted-side apparatus includes an apparatus on the animal that is mounted or is the recipient of chin resting. Accordingly, the aforementioned chin resting, detection of mounting behavior by horses or pigs, and detection of mating activity on the basis of mounting detection information are also included within the range of protection of this disclosure. For example, copulatory behavior for natural breeding can be detected with a mounting-side apparatus 10 attached from the neck to in front of the chest of a male horse and a mounted-side apparatus 20 attached to the back of a female horse. The same holds for pigs as well.

REFERENCE SIGNS LIST

10 Mounting-side apparatus
11 Notification interface
12 Communication interface (first method)
13 Controller
14 Memory
15 Power supply
16 Communication interface (second method)
17, 17' Holder
18 Housing
20 Mounted-side apparatus
21 Communication interface (first method)
22 Memory
23 Holder
30 User-side terminal
31 Power supply
32 Controller
32' Calculator
33 Display
34 Notification interface
35 Communication interface (second method)
36 Operation interface
37 Memory

The invention claimed is:

1. A mounting behavior detection system comprising:
   a mounting-side apparatus configured to be attached to a neck of first domestic animal; and
   a mounted-side apparatus configured to be attached at any position from a back to a tail of second domestic animal, wherein
   the mounting-side apparatus comprises a first communication interface, and the mounted-side apparatus comprises a second communication interface configured to emit a response signal to the first communication interface;
   wherein said first and second communication interfaces are near field communication (NFC) interfaces;
   wherein in response to said response signal, a notification signal is transmitted from said mounting-side apparatus of said first domestic animal to an external user-side terminal for displaying, by a display of said external user-side terminal, whether said first domestic animal and whether said second domestic animal are in heat conditions when said notification signal is compared to predetermined thresholds;
   wherein said predetermined thresholds are based on mounting counts and cumulative mounting times, and mounted counts and cumulative mounted times, for each of said first, said second, and other domestic animals present within a common environment.

2. The mounting behavior detection system of claim 1, wherein the response signal is emitted by using energy emitted from the mounting-side apparatus.

3. The mounting behavior detection system of claim 1, wherein the mounted-side apparatus comprises a plurality of mounted-side apparatuses, and
   the mounting behavior detection system is configured to detect mounting behavior in accordance with responses from the plurality of mounted-side apparatuses.

4. The mounting behavior detection system of claim 3, wherein each of the plurality of mounted-side apparatuses is disposed at a different position from the back to the tail of the second domestic animal, and the mounting behavior detection system determines that mounting behavior occurs in response to responses emitted from the plurality of mounted-side apparatuses.

5. The mounting behavior detection system of claim 1, wherein
   the mounted-side apparatus is further configured to be attached to hair or skin of the second domestic animal by adhesive.

6. The mounting behavior detection system of claim 1, wherein the mounted-side apparatus includes a Radio Frequency Identification (RFID) tag compliant with an NFC technical standard.

7. The mounting behavior detection system of claim 1, wherein the mounted-side apparatus does not include a power supply.

8. The mounting behavior detection system of claim 1, wherein the mounting behavior detection system is further configured to detect mounting behavior in accordance with a plurality of responses emitted from the mounted-side apparatus.

9. The mounting behavior detection system of claim 8, wherein the mounting behavior detection system is further configured to determine that mounting behavior occurs in response to a length of time between an initial response and a next response in the plurality of responses being within a predetermined length of time.

10. The mounting behavior detection system of claim 8, wherein the mounting behavior detection system is further configured to determine that mounting behavior occurs in response to a length of time between an initial response and a final response in the plurality of responses being within a predetermined length of time.

11. The mounting behavior detection system of claim 1, wherein the mounting behavior detection system is further configured to determine whether heat has occurred or to determine progress of heat in the first domestic animal in accordance with whether mounting behavior of the first domestic animal mounting the second domestic animal exceeds a first threshold, wherein the mounting behavior is calculated in accordance with communication between the mounting-side apparatus of the first domestic animal and the mounted-side apparatus of the second domestic animal.

12. The mounting behavior detection system of claim 1, wherein the mounting behavior detection system is further configured to determine whether heat has occurred or determine progress of heat in the first domestic animal in accordance with whether mounting count of the first domestic animal mounting the second domestic animal exceeds a second threshold, wherein the mounting count is calculated in accordance with communication between the mounting-side apparatus of the first domestic animal and the mounted-side apparatus of the second domestic animal.

13. The mounting behavior detection system of claim 1, wherein the mounting behavior detection system is further configured to determine whether heat has occurred or determine progress of heat in the first domestic animal in accordance with whether a cumulative mounting time of the first domestic animal mounting the second domestic animal exceeds a third threshold, wherein the cumulative mounting time is calculated in accordance with communication between the mounting-side apparatus of the first domestic animal and the mounted-side apparatus of the second domestic animal.

14. The mounting behavior detection system of claim 1, wherein the mounting behavior detection system is further configured to determine whether heat has occurred or to determine progress of heat in the first domestic animal in accordance with whether a count of communication between the mounting-side apparatus of the first domestic animal and the mounted-side apparatus of the second domestic animal exceeds a forth threshold.

15. The mounting behavior detection system of claim 1, wherein the mounting-side apparatus comprises memory, and the memory is configured to store information associated with first identification of the first domestic animal and with second identification of the second domestic animal in response to receiving the response signal.

16. The mounting behavior detection system of claim 15, wherein the response signal includes the second identification.

17. The mounting behavior detection system of claim 15, wherein the mounting-side apparatus is further configured to transmit the information to another apparatus in the mounting behavior detection system, in response to receiving the response signal.

18. A method for detecting a mounting behavior, comprising:

communicating a response signal from a mounted-side apparatus of a second domestic animal to a mounting side apparatus of a first domestic animal, wherein the mounted-side apparatus is configured to attach at any position from a back to a tail of the second domestic animal, wherein said response signal is communicated using near field communication (NFC) interfaces of the mounted-side apparatus and the mounting side apparatus; and in response to said response signal, transmitting a notification signal from said mounting-side apparatus of said first domestic animal to an external user-side terminal for displaying, by a display of said external user-side terminal, whether said first domestic animal and whether said second domestic animal are in heat conditions when said notification signal is compared to predetermined thresholds, wherein said predetermined thresholds are based on mounting counts and cumulative mounting times, and mounted counts and cumulative mounted times, for each of said first, said second, and other domestic animals present within a common environment.

19. A mounted-side apparatus comprising;

a mounted-side communication interface of the mounted-side apparatus of a second domestic animal configured to emit a response signal to a mounting-side communication interface of a mounting-side apparatus of a first domestic animal in response to receiving a transmission signal emitted from the mounting-side communication interface, wherein the mounted-side communication interface and the mounting-side communication interface are near field communication (NFC) interfaces; and the mounted-side apparatus is configured to be attached at any position from a back to a tail of a first domestic animals;

wherein in response to the response signal, a notification signal is sent from said mounting-side apparatus to an external user-side terminal for determining a state of at least one of the first domestic animal and a second domestic animal, and the state is related to progress of heat of at least one of the first domestic animal or the second domestic animal; and wherein the notification signal is compared to predetermined thresholds that are based on mounting counts and cumulative mounting times, and mounted counts and cumulative mounted times, for each of the first, the second, and other domestic animals present within a common environment.

* * * * *